United States Patent Office 3,575,967
Patented Apr. 20, 1971

3,575,967
17α-AMINOALKYL- AND AMINOALKYNYL-
19-NORSTEROIDAL 3,5-DIENES
Kurt W. Ledig, Philadelphia, Donald W. Oliver, West Chester, and Gerhard R. Wendt, Havertown, Pa., assignors to American Home Products Corporation, New York, N.Y.
No Drawing. Filed Feb. 5, 1969, Ser. No. 796,909
Int. Cl. C07c 173/10
U.S. Cl. 260—239.5     39 Claims

ABSTRACT OF THE DISCLOSURE 13-alkyl-17α-aminoalkynyl- and 17α-aminoalkylgona-3,5-dienes (I) are useful biocidally as amebicides, fungicides and trichomonacides. Compounds (I) are prepared by (a) dehydrating a corresponding 17α-aminoalkynyl- or -aminoalkyl 19-norsteroidal 4-en-3-ol (II); (b) aminoalkylating a corresponding 17α-alkynyl 19-norsteroidal 4-en-3-ol (III) and then dehydrating; or (c) aminoalkylating a corresponding 17α-alkynyl 19-norsteroidal 3,5-diene (IV).

DESCRIPTION OF THE INVENTION

This invention is concerned with new 17α-aminoalkyl- and aminoalkynyl- 19-norsteroidal 3,5-dienes. The compounds of this invention are biocidally-active, especially against pathogenic amebae, fungi and trichomonads.

This invention contemplates compounds of Formula I:

I wherein R is alkyl of from 1 to 5 carbon atoms; $R^1$ is hydrogen or alkanoyl of from 2 to 5 carbon atoms; and Y is $$-C\equiv C-CH_2-N\begin{pmatrix}A\\B\end{pmatrix} \text{ or } -CH_2CH_2CH_2-N\begin{pmatrix}A\\B\end{pmatrix}$$

wherein A and B, independently, are alkyl of from 1 to 5 carbon atoms, hydroxylalkyl of from 1 to 5 carbon atoms monophenyl-substituted alkyl of from 1 to 5 carbon atoms or, taken together, form a divalent radical selected from $$-C(R^3)_2(CH_2)_mC(R^3)_2-$$

$R^3$ being hydrogen or methyl and $m$ a whole number of from 2 to 6;

$$-CH_2CH_2CH(R^4)CH_2CH_2-$$

$R^4$ being hydroxy or carboxy;

$$-CH_2CH_2N(R^5)CH_2CH_2-$$

$R^5$ being selected from alkyl of from 1 to 5 carbon atoms or monohydroxy-substituted alkyl of from 1 to 5 carbon atoms; or $$-CH_2CH_2OCH_2CH_2-$$

and non-toxic, acid-addition salts thereof.

Preferred compounds comprise a subgeneric family of Formula I wherein R is methyl or ethyl, $R^1$ is hydrogen or acetyl and Y is $$-C\equiv CH_2-CH-N\begin{pmatrix}A\\B\end{pmatrix} \text{ or } -CH_2CH_2CH_2-N\begin{pmatrix}A\\B\end{pmatrix}, \text{ wherein}$$

$-N\begin{pmatrix}A\\B\end{pmatrix}$ is $-N(CH_3)_2$; $-N(CH_2CH_3)_2$; $-N(CH_2CH_2CH_3)_2$ $-N(CH_2CH_2OH)_2$; $-N(CH_3)CH_2-\text{(phenyl)}$; $-N\text{(piperidino)}$ $-N\text{(methylpiperidino)}$; $-N\text{(dimethylpiperidino)}$; $-N\text{(piperidino)}$; $-N\text{(pyrrolidino)}$ $-N\text{(azepino)}$; $-N\text{(hydroxypiperidino)}$—OH; $-N\text{(piperidino)}$—COOH $-N\text{(morpholino)}$; $-N\text{(N-methylpiperazino)}$—$CH_3$; or $-N\text{(piperazino)}$—$CH_2CH_2OH$ Special mention is made of a number of particularly valuable embodiments of this invention. These are:

13-ethyl-17α-[3 - (N - methylpiperazino) - 1 - propynyl] gona-3,5-dien-17-ol, especially in the form of a dihydrochloric acid addition salt;

17α-(3-dimethylamino-1-propynyl)-13 - ethylgona - 3,5-dien-17-ol, acetate, especially in the form of a hydrochloric acid addition salt;

1-[3-(13-ethyl-17-hydroxygona - 3,5 - dien - 17α - yl)-2-propynyl]isonipecotic acid, especially in the form of a hydrochloric acid addition salt;

17α-(3-dimethylaminopropyl)-13-ethyl-gona - 3,5 - dien-17-ol, especially in the form of a hydrochloric acid addition salt;

17α-(3-diethylamino-1 - propynyl) - 13 - ethylgona - 3,5-dien-17-ol, especially in the form of a hydrochloric acid addition salt;

17α-(3-dimethylamino-1-propynyl)-estra-3,5-dien-17-ol, especially in the form of a hydrochloric acid addition salt, and particularly in the form of a d-enantiomorph, substantially free of the l-enantiomorph;

17α-(3-dimethylamino-1-propynyl)-13 - ethylgona - 3,5-dien-17-ol, especially in the form of a hydrochloric acid addition salt;

13-ethyl-17-[3-(2,2,6,6-tetramethylpiperidino) - 1 - propynyl]gona-3,5-dien-17β-ol, especially in the form of a hydrochloric acid addition salt;

17α-[(3-benzyl-3-methylamino)-1-propynyl] - 13-ethyl-gona-3,5-dien-17-ol, especially in the form of a hydrochloric acid addition salt;

13-ethyl-17α-(3-pyrrolidino-1-propylnyl)gona - 3,5-dien-17-ol, especially in the form of a hydrochloric acid addition salt;

13 - ethyl - 17α - [3 - (4β - hydroxyethyl-piperazino)-1-propynyl]gona-3,5-dien-17-ol, especially in the form of a dihydrochloric acid addition salt, monohydrate;

17α - (3 - dipropylamino-1-propynyl)-13-ethylgona-3,5-dien-17-ol, especially in the form of a hydrochloric acid addition salt;

13 - ethyl-17α-(13-piperidino-1-propynyl)gona-3,5-dien-17-ol, especially in the form of a hydrochloric acid addition salt;

13 - ethyl - 17α - (3 - morpholino-1-propynyl)gona-3,5-dien-17-ol, especially in the form of a hydrochloric acid addition salt;

13 - ethyl - 17 - [3-(4-hydroxypiperidino)-1-propynyl]-gona-3,5-dien-17β-ol, especially in the form of a hydrochloric acid addition salt;

l - 17α - (3 - dimethylamino-1-propynyl)estra-3,5-dien-17-ol, preferably substantially free of the d-enantiomorph and especially in the form of a hydrochloric acid addition salt;

l - 17α - (3 - dimethylamino-1-propynyl)-13-ethyl-gona-3,5-dien-17-ol, preferably substantially free of the d-enantiomorph and especially in the form of a hydrochloric acid addition salt; and 17 - [3 - bis(2 - hydroxyethyl)amino - 1-propynyl]-13-ethyl-gona-3,5-dien-17-ol, especially in the form of a hydrochloric acid addition salt.

When used herein and in the appended claims, the term "alkyl of from 1 to 5 carbon atoms" contemplates lower hydrocarbon radicals, straight chain and branched, including, for example, methyl, ethyl, propyl, butyl and pentyl radicals. The term "alkanoyl of from 2 to 5 carbon atoms" contemplates lower alkanoyl radicals such as acetyl, propionyl, butyroyl and pentanoyl. The term "non-toxic, acid-addition salts" contemplates salts of the basic compounds of Formula I. These salts can be used to isolate the compounds and, in addition, are just as useful biocidally as the free bases and in many instances, because of improved solubility characteristics, they lend themselves advantageously to the formulation of a broader range of biocidal compositions. Illustrative of the salt-forming acids contemplated are inorganic acids such as hydrochloric, sulfuric, nitric, phosphoric, and the like; and organic acids such as acetic, malic, citric, aconitic, pamoic, and the like.

The 17α-aminoalkynyl (Ia) and 17α-aminoalkyl compounds (Ib) of Formula I are prepared by:

(a) Treating an appropriately-substituted 17α-aminoalkynyl- or aminoalkyl 19-norsteroidal 4-en-3-ol of Formula II with a dehydrating agent, preferably an acid dehydrating agent and especially preferably a mineral acid, such as hydrochloric acid, according to the following sequence:

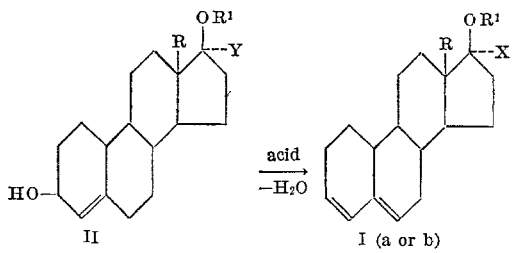

wherein R, R¹ and Y are as above defined;

(b) Treating an appropriately-substituted 17α-alkynyl 19-norsteroidal 4-en-3-ol, or alkanoate, of Formula (III or IIIa) first with formaldehyde and an appropriately-substituted amine:

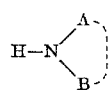

wherein A and B are as above defined, under Mannich-condensation conditions, such as in a dilute acetic acid solution to form the corresponding 17α-aminoalkynyl 19-nor-steroidal 4-en-3-ol (II), or the corresponding lower alkanoate, (IIa) and treating this with a dehydrating or dealkanoylating agent, such as a strong mineral acid, e.g., hydrochloric acid, accordnig to the following sequence:

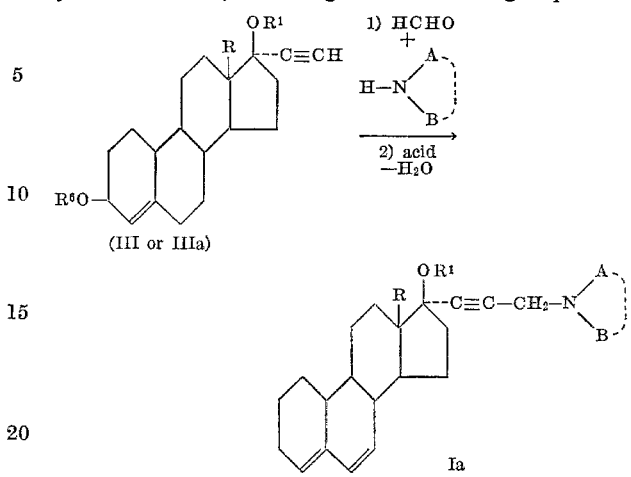

wherein R, R¹, A and B are as above defined and R⁶ is hydrochloric acid, according to the following sequence: atoms;

(c) Treating an appropriately-substituted 17α-ethynyl-19-norsteroidal 3,5-diene (IV) with formaldehyde and an appropriately-substituted amine:

$$H-N\begin{smallmatrix}A\\B\end{smallmatrix}$$

wherein A and B are as above defined, under Mannich condensation conditions, according to the following sequence:

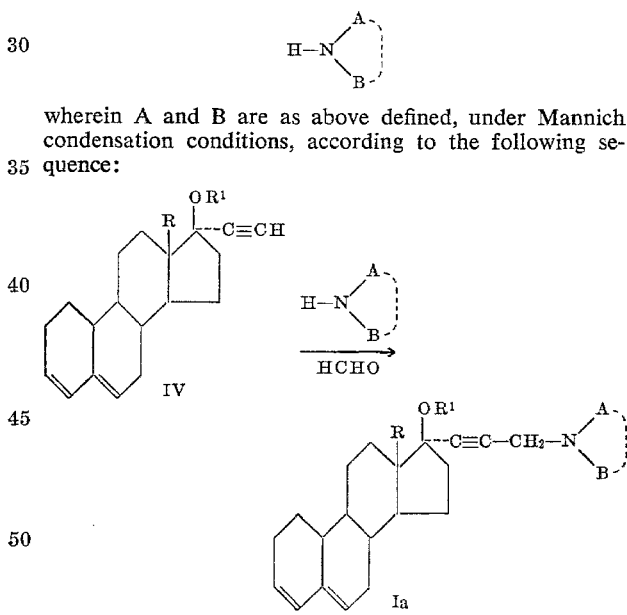

wherein R, R¹, A and B are as above defined.

The process, designated (a) above, is carried out under conditions which are not particularly critical. In one manner of proceeding the 17α-aminoalkynyl- or aminoalkyl 19-norsteroidal 4-en-3-ol of Formula II may be suspended in about 100 parts by volume of a lower alkanol, e.g., methanol and the mixture acidified to an acid pH, for example, pH 2, with a reagent such as isopropanolic hydrogen chloride. If the mixture is stirred at moderate temperature, e.g., from about 15° C. to about 75° C., preferably about 25° C. for from about 1 hour to about 24 hours, preferably about 12 hours, the reaction is usually substantially complete. The product (Ia or Ib) can be recovered by any usual means, such as by evaporating the solvent to leave the product as a residue—often, however, the product (in the form of an acid salt) precipitates during the reaction period and can be conveniently recovered by filtration. If desired, it may be purified by recrystallization from water or alcohol and water mixtures. The acid salt can be converted to the free base by treatment with a stronger base, such as an alkali metal hydroxide, e.g., sodium or potassium hydroxide, all according to standard means. The techniques of this process will be exemplified in detail hereinafter.

The process designated (b) above, is carried out under conditions which are not particularly critical. Those skilled in the art will immediately recognize the first step to be a type of Mannich reaction. In general, the acetylenic steroid (III or IIIa) is suspended in an inert solvent, such as dioxane, and is treated with a mixture of aqueous formaldehyde and the appropriate amine, preferably in the form of an addition salt with an organic acid, such as acetic acid, or an inorganic acid, such as hydrochloric acid. A very small amount of a metal salt catalyst, preferably cuprous chloride, can be added to improve the yield. The reaction is conducted at a temperature of from about 25° C. to about 100° C. and preferably at about 70° C. for a period of time long enough to effect the reaction; 20 hours at 65–75° C., for example, provides good yields in most cases. The reaction mixture containing the intermediate 3-ol or alkanoate then is dehydrated by the process as outlined under (a) above. Here, it is convenient not to isolate the intermediate, but merely to react it in solution with the dehydrating (dealkanoylating) agent. The mixture can be poured into ice water and made alkaline, e.g., with strong aqueous base, then the suspension extracted with ether and after drying and treating the extract with strong acid, e.g., isopropanolic hydrogen chloride, the product (Ia) precipitates. It is recovered, purified if desired by recrystallization and converted to the free base. These techniques will be exemplified in detail hereinafter.

The process designated (c) above is carried out under conditions which are not particularly critical. This, like (b), is a type of Mannich reaction. In one manner of proceeding, the 17α-ethynyl 19-norsteroidal 3,5-diene (IV) is suspended in about 10 parts of dioxane and there is added about 0.6 part of water, 0.38 part of formalin, 0.6 part of acetic acid, 0.38 part of dimethylamine (or a stoichiometrical amount of a corresponding secondary amine); a trace of cuprous chloride may be added to enhance the yield; and the mixture is heated, e.g., at 25°–100° C., preferably at about 70–75° C., until the reaction is complete, e.g., from about 6–72 hours, usually about 20 hours is sufficient. The product is recovered in any convenient manner. One means is to pour the mixture into ice and water, render the suspension basis (as with dilute aqueous sodium hydroxide) and extract the basic product with ether. Evaporating the ether leaves the product as a residue. Alternatively, addition of an acid to the ether solution causes precipitation of the product as an acid addition salt.

Starting materials for the preparation of compounds of Formula I of this invention are available or can be prepared by techniques available to those skilled in the art. The 17α-aminoalkyl or -aminoalkynyl 19-norsteroidal 4-en-3-ols of Formula II can be prepared by treating the corresponding 13-alkyl-17α-ethynylgon-4-en-3β,17-diols of U.K. 1,114,584 (G.A. Hughes and H. Smith) with formaldehyde and the corresponding secondary amine or salt thereof, under Mannich conditions as described, for example, in G. R. Wendt and K. W. Ledig, U.S. 3,169,167. The 17α-aminoalkyl starting materials of Formula II are prepared by forming the corresponding 3-alkoxy-13-alkyl-17α-aminoalkynylgona-1,3,5(10)-trien-17-ol by a Mannich reaction on the 13-alky-17α-alkynylgona-1,3,5-(10)-trien-3,17-diol, 3-ether of U.K. Pat. No. 1,111,447 using the procedure of U.S. 3,169,137, Example 1, reducing this to the 13-alkyl-17α-aminoalkylgona-1,3-5(10)-trien-3,17-diol, 3-ether by the procedure of Example 4, U.S. 3,169,137, performing a Birch reduction and an acid hydrolysis, according to the procedure described for the 13-methyl homologs, in G. Wendt and K. Ledig, U.S. 3,184,486, and thereby obtaining the 13-alkyl-17α-aminoalkyl-17-hydroxygon-4-en-3-one. This can be reduced to the 3-ol as described for the corresponding 17α-amino- alkynyl compound above, by a process which will also be illustrated in detail hereinafter.

Starting materials of Formula III or IIIa, the 13-alkyl-17α-ethynylgon-4-en-3,17-diols and 3,17-mono- and dialkanoates are prepared by the procedures of G. A. Hughes and H. Smith, British Pat. No. 1,114,584.

Starting materials of Formula IV are prepared by dehydrating or deacylating/dehydrating the corresponding 13-alkyl-17α-ethynylgon-4-en-3,17-diols and 3,17-mono- and dialkanoates (III or IIIa) with a strong mineral acid, e.g., hydrochloric acid, by procedures which will be exemplified in detail hereinafter.

The compounds of Formula I of this invention have been found to possess biocidal properties, mainly in that they are inimical in very small amounts of the order of 7.8–1000 μg./ml. in aqueous media to the growth of amebae, protozoa (trichomonads), fungae and the like. The instant compounds are thus useful in biocidal compositions in a variety of important fields of use. For example, they can be formulated and used in amebicidally-, trichomonacidally-, and fungicidally-active industrial cleaning compositions, and in soaps and detergents intended for veterinary use and in biocidally-active wash solutions to decontaminate premises, pastures, animal cages and the like, which have been infected with microorganisms, particularly of the type mentioned. They will be applied according to end use as powders, solutions, suspensions and the like, containing the active substance generally in concentrations of 0.1% to 0.7% by weight, or even as much as 1%, 1.5%, 1.8%, 2% and up to about 5%. In washing solutions for pastures and barns, the active compounds of this invention will be used generally in the range of from about 0.02% to .25% by weight.

Although, in common with most organic substances with relatively high molecular weights, compounds of Formula I have limited solubility in water, those skilled in the art will have no great difficulty in formulating them into a wide variety of biocidally-active compositions. In general, standard techniques can be employed and, where necessary, advantage is taken of the ability of compounds of Formula I to form salts, such as acid-addition salts, which have enhanced solubility in water. The active compounds per se can be made up in dilute aqueous solution. They can, in addition, where required be made up into more concentrated formulations with solvents such as N,N-dimethylacetamide or ethylene glycol dimethyl ether and the like. They can also be formulated as suspensions or solutions in an aqueous vehicle containing an organic co-solvent, such as for example, N,N-dimethylacetamide. Also, aqueous vehicles containing emulsifying agents, such as sodium lauryl sulfate, and relatively high concentrations, e.g., up to about 5% by weight, of the compounds of Formula I can be formulated by conventional techniques.

Illustrative of the biocidal properties of the compounds of this invention are results of tests to determine antiprotozoal, especially trichomonicidal, activity.

A 12.5 mg. portion of test material (as based on active moiety) is added to 2.5 ml. of 1% phosphate buffer, pH 6. Further two-fold dilutions are made in the same buffer. A 1 ml. volume of each dilution is transferred to small sterile screw cap assay tubes containing 3.8 ml. of Diamond medium (formula furnished by American Type Culture Collection, Rockville, Md.) and 0.1 ml. of calf serum. Each assay tube is inoculated with 0.1 ml. of a 48–72 hour culture of *Trichomonas vaginalis* strain ATCC No. 13972. A control assay tube containing no test material is similarly inoculated. The assay tubes are gently shaken and then incubated for 48 hours at 30° C. Following incubation the tubes are gently shaken and with the aid of a Pasteur pipette a drop is deposited on a Spiers-Levy eosinophil counting chamber. The chamber is examined by phase contrast microscopy. The number of organisms present in 1 mm.² is multiplied by 5000 in order to express the count per ml. The difference in the number of organisms present in the control tube and in the tubes containing the test material represents the relative potency of the test material and is expressed as the percentage kill at the specific dose level. Metronidazole may be used as a suitable positive control test material.

The results of testing illustrative members of this invention for trichomonicidal activity are given in the examples hereinafter.

Also illustrative of the biocidal properties of the instant compounds are results of tests to determine antifungal activity, especially against pathogenic fungi, such as *Histoplasma capsulatum*.

A 50 mg. portion of test material is solubilized or suspended in 5 ml. of sterile distilled water. Further twofold dilutions are made in the same solvent. A 0.2 ml. volume of each dilution is transferred to a sterile stainless steel capped 13 x 100 mm. culture assay tube containing 1.8 ml. of Brain heart infusion fortified with 10% sheep blood; the agar infusion is in a molten stage at 47–48° C. The assay tube contents are well mixed and the agar is allowed to solidify as a slant. Each slant is inoculated with the yeast phase of *Histoplasma capsulatum* ATCC No. 11407 which has been grown for at least 96 hours in the same medium at 35° C.; the growth of the inoculum slant is suspended in 2 ml. sterile distilled water and a drop of the suspension delivered by a Pasteur pipette is used to inoculate each assay tube slant. The assay tubes are incubated for 6 days at 35° C. The assay tube containing the least amount of test material which completely inhibits growth is reported as the minimal inhibitory value and is reported in terms of $\mu$g./ml.

The results of testing illustrative members of this invention for antifungal activity are given in the examples hereinafter.

An additional illustration of the biocidal activity of the instant compositions is demonstrated in the results of tests to determine anti-amebic activity, especially against *Endameba histolytica.*

The test substance is incorporated and diluted in the aqueous phase of Boeck-Drbohlav diphasic medium fortified with rice starch. The medium is inoculated with polybacteria and a known number of trophozoites of *E. histolytica* NIH 200. After 48 hours incubation at 35° C., the trophozoites are counted. The procedure is derived from Thompson, et al., Antibio. and Chemo., 6, 337–50 (1956).

The results of testing illustrative members of this invention for anti-amebic activity are given in the examples hereinafter.

In the product of a total synthesis which has not included a suitable resolution stage the compounds prepared by the invention will be present as racemates. Using a convention approved by Fieser and Fieser, "Steriods," p. 336 (1959), the compounds designated as the *d*-forms are the enantiomers corresponding in configuration to that of the natural hormone estrone. The corresponding enantiomorphs are consequently designated the *l*-forms and the reactants the *dl*-forms.

Racemates will be depicted by structural formulas which show only the enantiomorphs of the *d*-configuration. Often, an especially preferred embodiment will comprise the *l-isomer*. While the reasons are not clearly understood at this time, the *l*-isomers generally have higher potency against trichomonads. For example, *l*-13-ethyl-17α-(3-dimethylamino - 1 - propynyl)gona-3,5-dien-17-ol, hydrochloride is 8 times more potent than the corresponding *d*-isomer and *l*-17α-(3-dimethylamino - 1 - propynyl)estra-3,5-dien-17-ol is 10–20 times more potent than *d*-17α-(3-dimethylamino-1-propynyl)estra-3,5-dien - 17 - ol, itself a very potent trichomonicidal agent.

DESCRIPTION OF THE PREFERRED EMBODIMENTS

The following examples show the preparation of a number of compounds within the scope of this invention. They are merely illustrative and are not to be construed to limit the scope of the claims in any manner whatsoever.

EXAMPLE 1

*dl*-13-ethyl-17α-[3-(N-methylpiperazino)-1-propynyl]-gona-3,5-dien-17-ol and dihydrochloride (a) *dl*-13-ethyl - 17α - [3-(N-methylpiperazino)-1-propynyl]gona-4-ene-3β,17β-diol.—To a solution of 5.52 g. of *dl*-13-ethyl-17α-ethynylgon-4-ene-3β,17-diol in 56 ml. dioxane is added 4 ml. of water, 2 ml. of 40% formalin solution, 8 ml. of acetic acid, 2 g. of N-methylpiperazine, and 100 mg. of cuprous chloride. The mixture is heated at 60° C. for 18 hours under nitrogen. The reaction mixture is then poured into ice-water and basified with 10% sodium hydroxide solution. The resulting precipitate is extracted with $CHCl_3$ and the organic layer is washed with water, saturated brine solution and dried ($Na_2SO_4$). The clear chloroform solution is reduced in vacuo to a small volume until product begins to crystallize. A little ether is added and the product is filtered off, washed with ether and dried. Recrystallization from MeOH-ether affords 2.9 g. of the named compound M.P. 224–227° C.

$\lambda_{max.}^{KBr.}$ 3.05, 3.30, 3.48, 6.04, 6.90$\mu$

*Analysis.*—Found (percent): C, 75.96; H, 10.01; N, 6.57. $C_{27}H_{42}N_2O_2$ requires (percent): C, 76.01; H, 9.92; N, 6.57.

(b) *dl*-13-ethyl - 17α - [3-(N-methylpiperazino)-1-propynyl]gona-3,5-dien-17-ol, dihydrochloride.—A solution of 200 mg. of *dl*-13-ethyl-17α-[3-(4-methylpiperazino)-1-propynyl]gon-4-ene-3β,17β-diol in 25 ml. of methanol is acidified to pH 2 with isopropanolic·HCl and stirred overnight. The resulting precipitate is collected, washed with ether, and dried at 110° C. at $10^{-4}$ mm. to obtain 185 mg., and it is identified to be the title compound $\lambda_{max.}^{KBr.}$ 3.07, 3.45, 3.82, 4.75, 6.85$\mu$. $\lambda_{max}$ 235 m$\mu$ ($\epsilon$18,000)

*Analysis.*—Found (percent): C, 66.29; H, 8.61; N, 6.07; Cl, 14.46; $H_2O$, 1.66. $C_{27}H_{40}N_2O \cdot 2HCl \cdot \frac{1}{2}H_2O$ requires (percent): C, 66.10; H, 8.83; N, 5.71; Cl, 14.45; $H_2O$, 1.84.

*Trichomonas vaginalis* activity was 100% kill at 25 $\mu$g./ml.; MIC against *Histoplasma capsulatum* was 62.5 $\mu$g./ml. and *Endameba histolytica* activity was 97% kill at 250 $\mu$g./ml.

EXAMPLE 2

*dl*-17α-(3-dimethylamino-1-propynyl)-13-ethylgona-3,5-dien-17-ol, acetate and hydrochloride A suspension of 1.3 g. of *dl*-13-ethyl-17α-ethynylgona-3,5-dien-17-ol, acetate 13 ml. of dioxane, 0.8 ml. of water, 0.5 ml. of formalin, 0.8 ml. of acetic acid, 0.5 ml. of dimethylamine, and traces of cuprous chloride is stirred for 20 hours at 75° C. oil bath under nitrogen. The reaction mixture is poured into ice/water, made basic with diluted sodium hydroxide and the free base extracted into ether. The precipitate obtained on addition of isopropanolic hydrochloric acid is recrystallized from methanol/ether to yield 900 mg. of the title compound; M.P. 241° C.

*Analysis.*—Found (percent): C, 71.98; H, 8.51; N, 3.29. $C_{26}H_{37}NO_2 \cdot 2HCl$ requires (percent): C, 72.27; H, 8.86; N, 3.24.

*Trichomonas vaginalis* activity was 99% kill at 1000 $\mu$g./ml.

EXAMPLE 3

*dl* - 13 - ethyl - 17α-[3-(N-methylpiperazino)-1-propynyl] gona-3,5-dien-17-ol and dihydrochloride (alternate procedure)

To a solution of 4.3 g. of *dl*-13-ethyl-17α-ethynylgon-4-ene-3β,17-diol in 40 ml. of dioxane is added 3.1 ml. of water, 3 ml. of formalin, 4.0 g. of N-methyl piperazine, 2.6 ml. of glacial acetic acid and 100 mg. of CuCl. The reaction mixture is stirred for 20 hours under nitrogen at 65° C., poured into ice-water and made alkaline with 10% sodium hydroxide. A white precipitate is formed. The suspension was extracted three times with ether. The free base-containing extract is washed with brine, dried and filtered. Isopropanolic HCl is added slowly to the ethereal solution, resulting in a white precipitate which on crystallization from alcohol affords the title compound; M.P. 223–224° C.

Analysis.—Found (percent): C, 66.41; H, 8.72; N, 5.73; Cl, 14.60. $C_{27}H_{40}N_2O \cdot 2HCl \cdot \frac{1}{2}H_2O$ requires (percent): C, 66.10; H, 8.83; N, 5.71; Cl, 14.45.

EXAMPLE 4 dl-1-[3-(13-ethyl - 17 - hydroxygona - 3,5-dien-17α-yl)-2-propynyl]-isonipecotic acid hydrochloride (a) dl - 1 - [3-(13-ethyl-3β,17β-dihydroxygon-4-en-17-yl)-2-propynyl]-isonipecotic acid hemihydrate.—To a solution of 2.0 g. of dl-13-ethyl-17α-ethynylgon-4-en-3β,17-diol in 17.5 ml. of dioxane is added 1.3 ml. of water, 0.8 ml. of 40% formalin solution, 1.3 ml. of acetic acid, 1.8 g. of isonipecotic acid and 50 mg. of cuprous chloride. The mixture is stirred for 18 hours at 60° C. under nitrogen. The reaction mixture is then poured into ice-water and basified with 10% NaOH solution. The resulting precipitate is filtered off and recrystallized twice from methanol-ether to obtain 0.66 g. of material identified to be the product M.P. 200–205° C., $\lambda_{max}^{KBr}$ 3.07, 3.50, 6.35, 6.95μ

(No absorption in the UV spectrum.)

Analysis.—Found (percent): C, 72.32; H, 9.12; N, 3.44; H$_2$O, 2.20. $C_{28}H_{41}NO_4 \cdot \frac{1}{2}H_2O$ requires (percent): C, 72.38; H, 9.11; N, 3.01; H$_2$O, 1.94.

(b) dl - 1 - [3-(13-ethyl-17-hydroxygona-3,5-dien-17α-yl)-2-propynyl]-isonipecotic acid hydrochloride.—To a solution of 2.0 g. of dl-13-ethyl-17α-ethynylgon-4-ene-3β,17-diol in 17.5 ml. of dioxane is added 1.3 ml. of water, 0.8 ml. of 40% formalin solution, 1.3 ml. of acetic acid, 1.8 g. of isonipecotic acid, and 50 mg. of cuprous chloride. The mixture is heated to 60° C. and stirred under nitrogen for 24 hours. The reaction mixture is then poured into ice-water and basified with 10% sodium hydroxide solution. The resulting precipitate is extracted with chloroform, and the combined extracts washed with saturated brine solution and dried (MgSO$_4$). The clear chloroform solution is acidified with isopropanolic·HCl. The solvent is removed in vacuo and the residue triturated with ether. A precipitate is formed which is filtered off to obtain 0.8 g. of a product identified to be the product hydrochloride M.P. 225–230° C.

$\lambda_{max}$ 235 mμ (ε15,800), $\lambda_{max}^{KBr}$ 3.15, 3.47, 4.05, 5.79, 6.94μ

Analysis.—Found (percent): C, 70.74; H, 9.05; N, 2.85; Cl, 7.73. $C_{28}H_{39}NO_3 \cdot HCl$ requires (percent): C, 70.94; H, 8.51; N, 2.95; Cl, 7.48.

Trichomonas vaginalis activity was 99% kill at 100 μg./ml.; and Endameba histolytica activity was 95% kill at 250 μg./ml.

EXAMPLE 5 dl-17α-(3-dimethylaminopropyl)-13-ethylgona-3,5-dien-17-ol and hydrochloride (a) dl-17α - (3-dimethylamino-1-propynyl)-13-ethyl-3-methoxygona - 1,3,5(10)-trien-17-ol, hydrochloride.—A suspension of 10.0 g. of dl-13-ethyl-17α-ethynyl-3-methoxygona-1,3,5(10)-trien-17-ol, 100 ml. of dioxane, 6.5 ml. of water, 4.0 ml. of formalin (40%), 6.5 ml. of acetic acid, 3 ml. of dimethylamine, and approximately 100 mg. of cuprous chloride is stirred at 80° C. (oil bath) for 20 hours under nitrogen. The reaction mixture is poured into water and after the addition of 2 N sodium hydroxide to pH 12 the material is extracted with ether. The precipitate obtained on the addition of isopropanolic hydrochloric acid is recrystallized from methanol/ether to give 7.5 g. of the compound; M.P. 270° C.

Analysis.—Found (percent): C, 70.47; H, 8.93; N, 3.50; Cl, 8.54; $C_{25}H_{35}NO_2 \cdot HCl \cdot \frac{1}{2}H_2O$ requires (percent): C, 70.31; H, 8.73; N, 3.28; Cl, 8.30.

(b) dl-17α - (3 - dimethylaminopropyl)-13-ethyl-3-methoxygona - 1,3,5(10)trien-17-ol, hydrochloride.—A suspension of 5.0 g. of dl-17α-(3-dimethylamino-1-propynyl) 13-ethyl - 3 - methoxygona-1,3,5-(10)-trien-17-ol, hydrochloride 300 ml. of methanol, and 2.5 g. of Pd/C 5% is hydrogenated until hydrogen uptake ceases. The reaction mixture is filtered and the solvent evaporated. The residue is treated with diluted sodium hydroxide and the material extracted with ether. Treatment of the ether solution with isopropanolic hydrochloric acid affords 3.8 g. of the compound; M.P. 271° dec.

Analysis.—Found (percent): C, 69.36; H, 9.66; N, 3.48; Cl, 8.49. $C_{25}H_{39}NO_2 \cdot HCl \cdot H_2O$ requires (percent): C, 69.65; H, 9.58; N, 3.25; Cl, 8.22.

(c) dl-17α - (3 - dimethylaminopropyl)-13-ethyl-3-methoxygona-2,5(10)-dien-17-ol.—To a suspension of 3.0 g. dl - 17α - (3-dimethylaminopropyl)-13-ethyl-3-methoxygona-1,3,5(10)-trien-17-ol, hydrochloride 400 ml. of 1-methoxy-2-propanol, 3.0 g. of potassium tertiary-butyl alcoholate, 300 ml. of tetrahydrofuran and 500 ml. ammonia is added 3.0 g. of lithium in small pieces. After 30 minutes stirring, 30 g. of ammonium chloride is added followed by enough water to precipitate the compound; yield 2.7 g.; M.P. 150–170° C.

$\lambda_{max}^{KBr}$ 5.90, 6.00μ, no aromatic (d) dl - 17α - (3 - dimethylaminopropyl) - 13 - ethyl-17-hydroxygon-4-en-3-one.—To a solution of 42 ml. of methanol, 3 ml. of concentrated hydrochloric acid and 6 ml. of water is added 2.7 g. of dl-13-ethyl-17α-(3-dimethylaminopropyl) - 3 - methoxygona - 2,5 - (10) - dien-17-ol. The reaction mixture is stirred for 2 hours at room temperature (23° C.), diluted with water, and extracted with ether. The aqueous layer is basified, extracted with ether to yield on evaporation of the solvent 2.6 g. of the compound; M.P. 91–93° C.;

$\lambda_{max}^{KBr}$ 3.00, 6.01μ

(e) dl - 17α - (3 - dimethylaminopropyl) - 13 - ethyl-gon-4-ene-3β,17-diol.—To a stirring solution of 2.6 g. of dl - 13 - ethyl - 17α - (3 - dimethylaminopropyl) - 17-hydroxygon 4-en-3-one in 200 ml. of tetrahydrofuran cooled to +5° C. is added 2.6 g. of lithium aluminum tri-tertiary butoxyhydride. The reaction mixture is stirred for 2 hours. After standing at room temperature overnight, the reaction mixture is diluted with water, acidified with 2 N hydrochloric acid and the compound extracted with ether to yield 800 mg.; no UV absorption;

$\lambda_{max}^{KBr}$ 3.0μ

(f) di - 17α - ( - dimethylaminopropyl) - 13 - ethyl-gona-3,4-dien-17-ol.—To a solution of 800 mg. of dl-17α-(3 - dimethylaminopropyl - 13 - ethyl - gon - 4 - ene-3β,17-diol in ether is added isopropanolic hydrochloric acid (5.2 N) until strong acidity can be observed. The resulting precipitate is filtered and treated in methanol with isopropanolic hydrochloric acid overnight at about 23° C. On addition of ether, 400 mg. of the title compound is obtained; M.P. 210–211° C.; UV 236 mμ (ε 17,000).

Analysis.—Found (percent): C, 72.19; H, 10.04; N, 3.59; Cl, 9.33. $C_{24}H_{39}NO \cdot HCl \cdot \frac{1}{4}H_2O$ requires (percent): C, 72.32; H, 10.24; N, 3.52; Cl, 8.99.

Trichomonas vaginalis activity was 99% kill at 100 μg./ml.; MIC against Histoplasma capsulatum was 250 μg./ml.; and Endameba histolytica activity was 94% kill at 250 μg./ml.

EXAMPLE 6 dl-17α-(3-diethylamino-1-propynyl)-13-ethylgona-3,5-dien-17-ol and hydrochloride A suspension of 4.3 g. of dl-13-ethyl-17α-ethynylgon-4-ene-3β,17-diol, 40 ml. of dioxane, 3.1 ml. of water, 3.0 ml. of formalin (40%), 2.8 ml. diethylamine, 1.3 ml. of acetic acid, and 100 mg. of cuprous chloride is stirred under nitrogen for 22 hours. The reaction mixture is poured into ice-water, made alkaline with 2 N sodium hydroxide, and extracted with ether. Treatment of the ether solution with isopropanolic hydrochloric acid gives 4.6 g. of a precipitate which is reprecipitated from methanol-ether to give 3.7 g. of the title compound; M.P. 231–232° C.

*Analysis.*—Found (percent): C, 74.41; H, 9.56; N, 3.63; Cl, 8.76. $C_{26}H_{39}NO \cdot HCl$ requires (percent): C, 74.69; H, 9.64; N, 3.35; Cl, 8.48.

EXAMPLE 7

*dl*-17-(3-diethylamino-1-propynyl)-13-ethylgona-3,5-dien-17β-ol and hydrochloride (alternate procedure)

A suspension of 1.5 g. of *dl*-13-ethyl-17α-ethynylgon-4-ene-3β,17-diol, 3-acetate, 24 ml. of dioxane, 1 ml. of water, 1 ml. of formalin (40%), 0.9 ml. of diethylamine, 0.5 ml. acetic acid, and 50 mg. of cuprous chloride is stirred under nitrogen at 80° C. (oil bath) for 20 hours. The reaction mixture is poured into ice water, made basic with diluted sodium hydroxide and the material extracted with ether. Treatment of the organic solution with isopropanolic hydrochloric acid gives 1.5 g. of the title compound; M.P. 230–231° C.

*Analysis.*—Found (percent): C, 74.84; H, 9.57; N, 3.21; Cl, 8.49. $C_{26}H_{39}NO \cdot HCl$ requires (percent): C, 74.69; H, 9.64; N, 3.35; Cl, 8.48.

EXAMPLE 8

*d*-17α-(3-dimethylamino-1-propynyl)-estra-3,5-dien-17-ol and hydrochloride

A suspension of 2.7 g. of *d*-17α-ethynylestr-4-ene-3β,17-diol, 24 ml. of dioxane, 1.95 ml. of water, 1.9 ml. of formalin (40%), 0.8 ml. of acetic acid, 3.7 ml. of dimethylamine, and a few crystals of cuprous chloride is stirred and heated under nitrogen at 65° C. (oil bath) for 20 hours. The reaction mixture is poured into ice-water, made basic with 2 N sodium hydroxide and the material extracted with ether. Treatment of the organic solution with isopropanolic hydrochloric acid afforded after recrystallization from methanol/ether the title compound; M.P. 202–204° C.

*Analysis.*—Found (percent): C, 70.11; H, 8.98; N, 3.58. $C_{23}H_{33}NO \cdot HCl \cdot H_2O$ requires (percent): C, 70.11; H, 8.69; N, 3.55.

EXAMPLE 9

*dl*-17α-(3-dimethylamino-1-propynyl)-13-ethylgona-3,5-dien-17-ol and hydrochloride To a solution of 1.5 g. of *dl*-13-ethyl-17α-ethynylgon-4-ene-3β,17-diol in 25 ml. of dioxane is added 2.2 ml. of water, 2.1 g. of formalin, 1.4 g. of glacial acetic acid, 70 mg. of CuCl and 2 ml. of dimethylamine. The reaction mixture is stirred for 20 hours under nitrogen at 65° C., poured into ice-water mixture, and made alkaline with 10% sodium hydroxide. A white precipitate is formed. The suspension is extracted three times with ether. The organic layer is washed with brine, dried and filtered. Isopropanolic HCl is added slowly to ethereal layer. The white precipitate is collected and crystallized from methanol-ether, yielding 1.25 g. of the title compound, M.P. 248–249° C.

*Analysis.*—Found (percent): C, 73.71; H, 9.03; N, 3.32; Cl, 9.10. $C_{24}H_{35}NO \cdot HCl$ requires (percent): C, 73.91; H, 9.31; N, 3.59; Cl, 9.09.

*Trichomonas vaginalis* activity was 100% kill at 25 μg./ml.; MIC against *Histoplasma capsulatum* was 31.3 μg./ml.; and *Endameba histolytica* activity was 100% kill at 7.80 μg./ml.

EXAMPLE 10

*dl*-13-ethyl-17-[3-(2,2,6,6-tetramethylpiperidino)-1-propynyl]gona-3,5-dien-17β-ol and hydrochloride To a solution of 3.0 g. of *dl*-13-ethyl-17α-ethynylgon-4-en-3β,17-diol in 26.3 ml. of dioxane is added 1.95 ml. of water, 1.2 ml. of 40% formalin solution, 1.95 ml. of acetic acid, 1.5 ml. of 2,2,6,6-tetramethylpiperidine, and 75 mg. of cuprous chloride. The mixture is stirred and heated to 60° C. under nitrogen for 20 hours. The reaction mixture is then poured into ice water and basified with 10% sodium hydroxide solution. The resulting precipitate is extracted with ether (note: a brown emulsion forms at this point). The emulsion is removed by filtering, and the organic layer washed with saturated brine solution and dried ($MgSO_4$), and filtered. The filtrate is acidified with isopropanolic HCl. The resulting white precipitate is collected and recrystallized from methanol to obtain 1.1 g. of material identified to be the title compound, M.P. 228–232° C. dec., $\lambda_{max}$ 235 mμ (ε 18,900).

$\lambda_{max.}^{KBr.}$ 3.00, 3.17, 346, 6.89μ

*Analysis.*—Found (percent): C, 75.96; H, 9.75; N, 2.97; Cl, 7.37. $C_{31}H_{47}NO \cdot HCl$ requires (percent): C, 76.58; H, 9.95; N, 2.88; Cl, 7.29.

*Trichomonas vaginalis* activity was 100% kill at 100 μg./ml.

EXAMPLE 11

*dl*-17α-[(3-benzyl-3-methylamino)-1-propynyl]-13-ethylgona-3,5-dien-17-ol and hydrochloride A suspension of 4.3 g. of *dl*-13-ethyl-17α-ethynylgon-4-ene-3β,17-diol, 40 ml. dioxane, 3.1 ml. of water, 3.0 ml. of formalin (40%), 2.8 ml. of N-methylbenzylamine, 1.3 ml. of acetic acid and 100 mg. of cuprous chloride is stirred under nitrogen for 18 hours at 75° C. (oil bath). The reaction mixture is poured into ice water, made basic with 2 N sodium hydroxide and the material extracted with ether. The clear filtrate is treated with isopropanolic hydrochloric acid and the supernatent decanted. To the gummy residue is added ether and the suspension made basic with diluted sodium hydroxide. The ether extract is evaporated to give 3.0 g. of the compound;

$\lambda_{max.}^{EtOH}$ 235 mμ (ε 16,400)

*Analysis.*—Found (percent): N, 3.94. $C_{30}H_{39}NO$ requires (percent): N, 3.26.

EXAMPLE 12

*dl*-13-ethyl-17α-(3-pyrrolidino-1-propynyl)gona-3,5-dien-17-ol and hydrochloride To a solution of 4 g. of *dl*-13-ethyl-17α-ethynylgon-4-ene-3β,17-diol in 40 ml. of dioxane is added 3.1 ml. of water, 3 ml. of formalin, 1.4 ml. of glacial acetic acid, 1 g. of pyrrolidine and 100 mg. of CuCl. The reaction mixture is stirred for 20 hours under nitrogen at 65° C., and then poured into ice-water mixture. Then the solution was made alkaline with 10% sodium hydroxide. A white precipitate is formed. The suspension is extracted three times with ether. The organic layer is washed with brine and filtered. Isopropanolic HCl is added slowly to ethereal layer. The white precipitate is collected and crystallized from methanol-ether yielding 3.1 g. of the product; M.P. 276–279° C.

*Analysis.*—Found (percent): C, 74.97; H, 9.02; N, 3.60; Cl, 8.66. $C_{26}H_{37}NO \cdot HCl$ requires (percent): C, 74.98; H, 9.15; Cl, 8.53; N, 3.37.

*Trichomonas vaginalis* activity was 99% kill at 100 μg./ml.; MIC against *Histoplasma capsulatum* was 500 μg./ml. and *Endameba histolytica* activity was 100% kill at 1000 μg./ml.

EXAMPLE 13

*dl*-13 - ethyl - 17α - [3-(4β-hydroxyethylpiperazino)-1-propynyl]gona-3,5-dien-17-ol and dihydrochloride, hydrate To a solution of 2.0 g. of *dl*-13-ethyl-17α-ethynylgon- 4-ene-3β,17-diol in 17.5 ml. of dioxane is added 1.3 ml. of water, 0.8 ml. of 40% formalin, 1.3 ml. of acetic acid, and 0.91 g. of N-β-hydroxyethylpiperazine, and 50 mg. of cuprous chloride. The mixture is stirred and heated to 60° C. under nitrogen for 20 hours. The reaction mixture is then poured into ice-water and basified with 10% NaOH solution. The resulting precipitate is extracted with chloroform, and the combined organic layer is washed with saturated brine solution and then dried ($Na_2SO_4$). The clear chloroform solution is reduced to a small volume in vacuo and acidified with isopropanolic·HCl. The mixture is diluted with ether and the resulting product is collected. Recrystallization from MeOH-ether, 10:1, affords 1.9 g. of material identified to be the product, M.P. 224–228° C. $\lambda_{max}$ 236 m$\mu$ ($\epsilon$ 18,200).

$\lambda_{max}^{KBr}$ 3.05, 3.48, 4.00, 6.15, 6.94$\mu$

*Analysis.*—Found (percent): C, 63.59; H, 8.32; N, 5.24; Cl, 14.01. $C_{28}H_{42}N_2O_2 \cdot 2HCl \cdot H_2O$ requires (percent): C, 63.50; H, 8.76; N, 5.29; Cl, 13.39.

*Trichomonas vaginalis* activity was 100% kill at 25 $\mu$g./ml.; MIC against *Histoplasma capsulatum* was 125 $\mu$g./ml.; and *Endameba histolytica* activity was 96% kill at 250 $\mu$g./ml.

EXAMPLE 14

*dl*-17α-(3-dipropylamino-1-propynyl)-13-ethylgona-3,5-dien-17-ol and hydrochloride To a solution of 2.76 g. of *dl*-13-ethyl-17α-ethynylgon-4-ene-3β,17-diol and 28 ml. of dioxane is added 2 ml. of water, 1.0 ml. of 40% formalin, 2 ml. of acetic acid, 1.37 ml. of di-n-propylamine, and 60 mg. of cuprous chloride. The mixture is stirred and heated to 60° C. under nitrogen for 24 hours. The reaction mixture is then poured into ice-water and basified with 10% NaOH. The resulting precipitate is extracted with ether, and the combined ether extracts are washed with water and saturated brine solution, and then dried ($MgSO_4$). The clear ether solution is acidified with isopropanolic HCl. The resulting precipitate is collected and recrystallized from MeOH-ether to obtain 0.79 g. of compound, M.P. 253–255° C. dec., $\lambda_{max}$ 236 m$\mu$ ($\epsilon$ 19,400)

$\lambda_{max}^{KBr}$ 3.13, 3.47, 3.92, 4.05, 6.10$\mu$

*Analysis.*—Found (percent): C, 75.28; H, 9.91; N, 3.15; Cl, 8.16. $C_{28}H_{42}NO \cdot HCl$ requires (percent): C, 75.38; H, 9.94; N, 3.14; Cl, 7.95.

*Trichomonas vaginalis* activity was 98% kill at 1000 $\mu$g./ml.; *Endameba histolytica* activity was 100% kill at 31.3 $\mu$g./ml.

EXAMPLE 15

*dl*-13-ethyl-17α-(3-piperidino-1-propynyl)gona-3,5-dien-17-ol and hydrochloride To a solution of 4.0 g. of *dl*-13-ethyl-17α-ethynylgon-4-ene-3β,17-diol in 40 ml. of dioxane is added 3.1 ml. of water, 1.4 ml. of glacial acetic acid, 2.0 g. of piperidine, 3.0 ml. of formalin and 100 mg. of CuCl. The reaction mixture is stirred for 20 hours under nitrogen at 65° C., poured into ice-water and made alkaline with 10% sodium hydroxide. A white precipitate is formed. The suspension is extracted three times with ether and the extract washed with brine, dried and filtered. Isopropanolic HCl is added slowly to the filtrate. The white precipitate is collected and recrystallized from alcohol to give the compound; M.P. 263–266° C.

*Analysis.*—Found (percent): C, 75.08; H, 9.23; N, 3.08; Cl, 8.14. $C_{27}H_{39}ON \cdot HCl$ requires (percent): C, 75.40; H, 9.37; N, 3.25; Cl, 8.24.

*Trichomonas vaginalis* activity was 100% kill at 25 $\mu$g./ml.; MIC against *Histoplasma capsulatum* was 125 $\mu$g./ml.; and *Endameba histolytica* activity was 100% kill at 31.3 $\mu$g./ml.

EXAMPLE 16

*dl*-13-ethyl-17α-(3-morpholino-1-propynyl)gona-3,5-dien-17β-ol and hydrochloride To a solution of 3.1 g. of *dl*-13-ethyl-17α-ethynylgon-4-ene-3β,17-diol in 29 ml. of dioxane is added 2.2 ml. of water, 2.12 ml. of formalin, 2 ml. of morpholine, .94 ml. of glacial acetic acid and 72.3 mg. of CuCl. The reaction mixture is stirred for 20 hours under nitrogen at 65° C., poured into ice-water mixture and made alkaline with 10% sodium hydroxide. A white precipitate forms. The suspension is extracted three times with ether. The organic layer is washed with brine, dried and filtered. Isopropanolic HCl is added slowly to ethereal layer. The white precipitate is collected, and triturated with methanol-ethanol; yielding 3 g. of product; M.P. 288–290° C.

*Analysis.*—Found (percent): C, 72.19; H, 9.16; N, 3.10; Cl, 9.06. $C_{26}H_{37}NO_2 \cdot HCl$ requires (percent): C, 72.31; H, 8.81; N, 3.25; Cl, 8.23.

*Trichomonas vaginalis* activity was 100% kill at 25 $\mu$g./ml.; MIC against *Histoplasma capsulatum* was 31.3 $\mu$g./ml.; and *Endameba histolytica* activity was 99% kill at 250 $\mu$g./ml.

EXAMPLE 17

*dl*-13-ethyl-17α-[3-(4-hydroxypiperidino)-1-propynyl] gona-3,5-dien-17-ol and hydrochloride To a solution of 2.0 g. of *dl*-13-ethyl-17α-ethynylgon-4-ene-3β,17-diol in 17.5 ml. of dioxane is added 1.3 ml. of water, 0.8 ml. of 40% formalin solution, 1.3 ml. of acetic acid, 0.71 g. of 4-hydroxypiperidine, and 50 mg. of cuprous chloride. The mixture is stirred and heated to 60° C. under nitrogen for 24 hours. The reaction mixture is then poured into ice-water and basified with 10% NaOH. The resulting precipitate is extracted with chloroform, and the combined extracts washed with saturated brine solution and dried ($MgSO_4$). The chloroform layer is reduced to a small volume in vacuo and acidified with isopropanolic HCl. On addition of ether a precipitate forms which on crystallization from methanol affords 400 mg. of compound, M.P. 162° C. dec., $\lambda_{max}^{KBr}$ 3.10, 3.50, 4.25, 6.92$\mu$, $\lambda_{max}$ 236 m$\mu$ ($\epsilon$ 14,870)

*Analysis.*—Found (percent): C, 70.15; H, 8.93; N, 2.93; Cl, 8.05. $C_{27}H_{39}NO_2 \cdot HCl \cdot H_2O$ requires (percent): C, 69.87; H, 9.12; N, 3.02; Cl, 7.64.

*Trichomonas vaginalis* activity was 99% kill at 50 $\mu$g./ml.; MIC against *Histoplasma capsulatum* was 62.5 $\mu$g./ml.; *Endameba histolytica* activity was 100% kill at 31.3 $\mu$g./ml.

EXAMPLE 18

*l*-17α-(3-dimethylamino-1-propynyl)-estra 3,5-dien-17-ol and hydrochloride (a) *l*-17α-ethynylestra-4-ene-3β,17-diol. To a stirring solution of 3.5 g. of *l*-17α-ethynyl-17-hydroxyestra-4-ene-3-one in 150 ml. of tetrahydrofuran cooled to −9° C. is added 3.5 g. of lithium aluminum tri-tertiary butoxy hydried. The reaction mixture is stirred for 6 hours and left at about 23° C. overnight. After addition of ice and acidification with diluted hydrochloric acid, the material is extracted with ether. Crystallization from methanol gave 1.4 g. of the compound; M.P. 130–132° C.

*Analysis.*—Found (percent): C, 80.21; H, 9.32; $C_{20}H_{28}O_2$ requires (percent): C, 79.95; H, 9.39.

(b) *l* - 17α - (3 - dimethylamino)propynyl)estra-3,5-dien-17-ol and hydrochloride.—A suspension of 1.3 g. of *l*-17α-ethylestra-4-ene-3β,17-diol, 12 ml. of dioxane, -1 ml. of water, 1 ml. of formalin (40%), 1.9 ml. of dimethylamine, and a few crystals of cuprous chloride is stirred under nitrogen for 20 hours at 72° C. (oil bath). The reaction mixture is poured into ice water, made basic with 2 N sodium hydroxide and the material extracted with ether. Treatment of the organic layer with isopropanolic hydrochloric acid gives the compound; M.P. 224–225° C.;

$$\lambda_{max}^{EtOH}\ 236\ m\mu\ (\epsilon\ 17,900)$$

*Analysis.*—Found (percent): N, 3.90: $C_{23}H_{33}NO \cdot HCl$ requires (percent): N, 3.73.

*Trichomonas vaginalis* actvity was 100% kill at 50 µg./ml.; and *Endameba histolytica* activity was 99% kill at 15.6 µg./ml.

EXAMPLE 19

*l*-17α-(3-dimethylamino-1-propynyl)-13-ethylgona-3,5-dien-17-ol and hydrochloride (a) *l*-13-ethyl-17-ethylgon-4-ene-3β,17-diol.—To a stirring solution of 5.0 g. of *l*-13-ethyl-17α-ethynyl-17-hydroxygon-4-en-3-one in 230 ml. tetrahydrofuran cooled to −10° C. is added 5.0 g. of lithium aluminum tri-tertiary butoxy hydride. The reaction is stirred until it reaches about 23° C. and then allowed to stand overnight. Ice is added followed by 2 N hydrochloric acid and the material extracted with ether. Recrystallization from methanol/water affords 3.5 g. of the compound; M.P. 166–167° C.

*Analysis.*—Found: C, 80.12; H, 9.49: $C_{21}H_{30}O_2$ requires (percent): C, 80.21; H, 9.62.

(b) *l*-13-ethyl-17α-(3-dimethylamino-1-propynyl)gona-3,5-dien-17-ol, hydrochloride.—A suspension of 3.3 g. of *l*-13-ethyl-17α-ethynylgon-4-ene-3β,17-diol, 33 ml. of dioxane, 2.2 ml. of water, 1.4 ml. of formalin (40%), 2.2 ml. of acetic acid, 1 ml. of dimethylamine and approximately 100 mg. of cuprous chloride is stirred at 78° C. (oil bath) under nitrogen for 20 hours. After pouring the reaction mixture into ice/water, it is made basic with diluted sodium hydroxide and the material extracted with ether. The clear ether solution is treated with isopropanolic hydrochloric acid and the resulting precipitate recrystallized from methanol/ether to obtain 1.1 g. of the compound; M.P. 257–258° C. dec.

*Analysis.*—Found (percent): C, 73.51; H, 9.28; N, 4.01; Cl, 9.36. $C_{24}H_{35}NO \cdot HCl$ requires (percent): C, 73.91; H, 9.31; N, 3.59; Cl, 9.09.

*Trichomonas vaginalis* activity was 97% kill at 6.25 µg./ml.; MIC against *Histoplasma capsulatum* was 62.5 µg./ml.; and *Endameba Histolytica* activity was 96% kill at 250 µg./ml.

EXAMPLE 20

*d*-17-(3-dimethylamino-1-propynyl)-13-ethylgona-3,5-dien-17β-ol and hydrochloride A solution of 8.2 g. of *d*-13-ethyl-17α-ethynylgon-4-ene-3β,17-diol, 15 ml. of water, 14 ml. of 40% formalin, 9.5 ml. of acetic acid, and 14 ml. of dimethylamine in 167 ml. of dioxane with 500 mg. of cuprous chloride is stirred and heated to 70° C. for 24 hours under nitrogen. The mixture is poured into water and basified with 10% sodium hydroxide. The resulting precipitate is extracted with ether, and the combined extracts are washed with saturated brine solution and dried over magnesium sulfate. The clear ether solution is acidified with isopropanolic· HCl. The resulting gum is scratched and cooled to +10° C. to yield a gelatinous precipitate which fails to crystallize. The gel is basified with saturated sodium bicarbonate solution. After extracting with ether and drying, the solvent is evaporated under reduced pressure to a small volume. The crystalline material formed is collected and dissolved in 100 ml. of chloroform-ether, 4:1 and acidified with 4 N isopropanolic·HCl. The white powder obtained is reprecipitated thrice from methanolether after being reacidified in methanol solution to yield 1.3 g. of product. M.P. 252–258° C. with decomposition, $\lambda_{max}$ 236 m$\mu$ ($\epsilon$ 21,100).

*Analysis.*—Found (percent): C, 73.82; H, 9:51; N, 3.63; Cl, 9.22. $C_{24}H_{35}NO \cdot HCl$ requires (percent): C, 73.91; H, 9.31; N, 3.59; Cl, 9.09.

EXAMPLE 21

*dl*-17α-[3-bis(2-hydroxyethyl)-amino-1-propynyl]-13-ethylgona-3,5-dien-17-ol and hydrochloride A suspension of 1.5 g. of *dl*-13-ethyl-17-ethynylgon-4-ene-3β,17β-diol in 15 ml. of dioxane, 1 ml. of water, 0.6 ml. of formalin (40%). 1 ml. of acetic acid, 0.6 ml. of diethanolamine, and traces of cuprous chloride is stirred for 20 hours at 80° C. oil bath under nitrogen. The reaction mixture is poured into water, made basic with diluted sodium hydroxide and the material extracted with ether. The precipitate obtained on addition of isopropanolic hydrochloric acid is recrystallized from methanol/ether to obtain 800 mg. of the title compound; M.P. 192–194° C. ($\epsilon$ 20,100) UV 235.5 m$\mu$.

*Analysis.*—Found (percent): C, 67.10; H, 8.58; N, 3.09; Cl, 7.97. $C_{26}H_{39}N_3 \cdot HCl \cdot H_2O$ requires (percent): C, 66.71; H, 9.04; N, 2.99; Cl, 7.58.

EXAMPLE 22

*dl*-13-ethyl-17α-ethynylgona-3,5-dien-17-ol, acetate

A solution of 3.0 g. of *dl*-13-ethyl-17α-ethynylgon-4-ene-3β,17-diol, 300 ml. of ethyl acetate and 28.8 ml. acetic anhydride is treated with 0.3 ml. of 70% perchloric acid for exactly 3 minutes at room temperature. After the addition of an excess of sodium bicarbonate solution, the organic layer is separated and washed with brine. The residue obtained on evaporation of the solvent is refluxed with 300 ml. of alcohol and a few drops of pyridine. The reaction mixture is evaporated to 60 ml. to give after the addition of a few drops of water, 1.5 g. of the title compound, M.P. 162–165° C.

*Analysis.*—Found (percent): C, 81.33; H, 8.99, $C_{23}H_{30}O_2$ requires (percent): C, 81.61; H, 8.93.

EXAMPLE 21

The procedure of Example 2 is repeated substituting stoichiometrical amounts of appropriately-substituted secondary amines for dimethylamine and the following compounds within the scope of this invention are obtained:

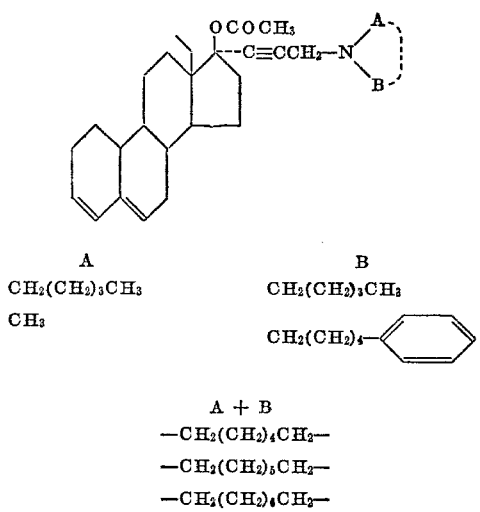

| A | B |
|---|---|
| $CH_2(CH_2)_3CH_3$ | $CH_2(CH_2)_3CH_3$ |
| $CH_3$ | |
| | $CH_2(CH_2)_4$—⟨⟩ |

A + B
—$CH_2(CH_2)_4CH_2$—
—$CH_2(CH_2)_5CH_2$—
—$CH_2(CH_2)_6CH_2$—

EXAMPLE 22

The procedure of Example 5, step (a)–(e) is repeated with appropriately-substituted 17α - aminopropynyl steroids and the following compounds within the scope of this invention are prepared:

| R | A | B |
|---|---|---|
| $CH_2(CH_2)_nCH_3$ | $CH_3$ | $CH_3$ |
| $CH_3CH_2$ | $CH_2(CH_3)_3CH_3$ | $CH_2(CH_3)_3CH$ |
| $CH_3CH_2$ | $CH_3$ | $CH_2(CH_2)_4-\text{Ph}$ |
| $CH_3CH_2$ | $-CH_2(CH_2)_4CH_2-$ | |
| $CH_3CH_2$ | $-CH_2(CH_2)_5CH_2-$ | |
| $CH_3CH_2$ | $-CH_2(CH_2)_6CH_3-$ | |

EXAMPLE 23

The sulfuric, nitric, phosphoric, acetic, malic, citric, aconitic and pamoic acid addition salts of 13-ethyl-17α-[3-(N-methylpiperazino) - 1 - propynylgona-3,5-dien-17-ol (Example 1) are prepared by treating an ether solution of the free base with stoichiometrical amounts of the respective acids in isopropanol, then evaporating the solvents, leaving the addition salt as a residue.

What is claimed is:

1. A compound selected from those of the formula wherein R is alkyl of from 1 to 5 carbon atoms; $R^1$ is hydrogen or alkanoyl of from 2 to 5 carbon atoms; and Y is $$-C\equiv C-CH_2-N\begin{pmatrix}A\\B\end{pmatrix}$$

or $$-CH_2CH_2CH_2-N\begin{pmatrix}A\\B\end{pmatrix}$$

wherein A and B, independently, are alkyl of from 1 to 5 carbon atoms, hydroxyalkyl of from 1 to 5 carbon atoms monophenyl-substituted alkyl of from 1 to 5 carbon atoms or, taken together, form a divalent radical selected from $$-C(R^3)_2(CH_2)_mC(R^3)_2-$$

$R^3$ being hydrogen or methyl and $m$ a whole number of from 2 to 6;

$$-CH_2CH_2CH(R^4)CH_2CH_2-$$

$R^4$ being hydroxy or carboxy;

$$-CH_2CH_2N(R^5)CH_2CH_2-$$

$R^5$ being selected from alkyl of from 1 to 5 carbon atoms or monohydroxy-substituted alkyl of from 1 to 5 carbon atoms; or $$-CH_2CH_2OCH_2CH_2-$$

and non-toxic, acid-addition salts thereof.

2. A compound as defined in claim 1, wherein R is methyl or ethyl, $R^1$ is hydrogen or acetyl and Y is $$-C\equiv CH-CH_2-N\begin{pmatrix}A\\B\end{pmatrix}$$

or $$-CH_2CH_2CH_2-N\begin{pmatrix}A\\B\end{pmatrix}$$

wherein $-N\begin{pmatrix}A\\B\end{pmatrix}$ is $-N(CH_3)_2$; $-N(CH_2CH_3)_2$; $-N(CH_2CH_2CH_3)_2$; $-N(CH_2CH_2OH)_2$ $-N(CH_3)CH_2-\text{Ph}$; and various cyclic amines including piperidine, pyrrolidine, morpholine, piperazine, N-methylpiperazine, N-hydroxyethylpiperazine, isonipecotic acid, and 2,2,6,6-tetramethylpiperidine.

3. A compound as defined in claim 1 which is 13-ethyl-17α - [3-(N-methylpiperazino)-1-propynyl]gona-3,5-dien-17-ol.

4. A compound as defined in claim 3 in the form of a dihydrochloric acid addition salt.

5. A compound as defined in claim 1 which is 17α-(3-dimethylamino - 1 - propynyl)-13-ethylgona-3,5-dien-17-ol, acetate.

6. A compound as defined in claim 5 in the form of a hydrochloric acid addition salt.

7. A compound as defined in claim 1 which is 1-[3-(13-ethyl - 17 - hydroxygona-3,5-dien-17α-yl)-2-propynyl]-isonipecotic acid.

8. A compound as defined in claim 7 in the form of a hydrochloric acid addition salt.

9. A compound as defined in claim 1 which is 17α-(3-dimethylaminopropyl)-13-ethylgona-3,5-dien-17-ol.

10. A compound as defined in claim 9 in the form of a hydrochloric acid addition salt.

11. A compound as defined in claim 1 which is 17α(3-diethylamino-1-propynyl)-13-ethylgona-3,5-dien-17-ol.

12. A compound as defined in claim 11 in the form of a hydrochloric acid addition salt.

13. A compound as defined in claim 1 which is 17α-(3-dimethylamino-1-propynyl)estra-3,5dien-17-ol.

14. A compound as defined in claim 13 in the form of a hydrochloric acid addition salt.

15. A compound as defined in claim 14 in the form of a $d$-enantiomorph, substantially free of the $l$-enantiomorph.

16. A compound as defined in claim 1 which is 17α-(3-dimethylamino-1-propynyl)-13-ethylgona-3,5--17-ol.

17. A compound as defined in claim 16 in the form of a hydrochloric acid addition salt.

18. A compound as defined in claim 1 which is 13-ethyl - 17-[3-(2,2,6,6-tetramethylpiperidino)-1-propynyl]gona-3,5-dien-17β-ol.

19. A compound as defined in claim 18 in the form of a hydrochloric acid addition salt.

20. A compound as defined in claim 1 which is 17α-[(3 - benzyl - 3-methylamino-1-propynyl]-13-ethylgona-3,5-dien-17-ol.

21. A compond as defined in claim 20 in the form of a hydrochloric acid addition salt.

22. A compound as defined in claim 1 which is 13-ethyl-17α-(3-pyrrolidino-1-propynyl)gona-3,5-dien-17-ol.

23. A compound as defined in claim 22 in the form of a hydrochloric acid addition salt.

24. A compound as defined in claim 1 which is 13-ethyl-17α - [3 - (4β-hydroxyethylpiperazino)-1-propynyl]gona-3,5-dien-17-ol.

25. A compound as defined in claim 24 in the form of a dihydrochloric acid addition salt, monohydrate.

26. A compound as defined in claim 1 which is 17α-(3-dipropylamino-1-propynyl)-13-ethylgona-3,5-dien-17-ol.

27. A compound as defined in claim 26 in the form of a hydrochloric acid addition salt.

28. A compound as defined in claim 1 which is 13-ethyl-17α-(3-piperidino-1-propynyl)gona-3,5-dien-17-ol.

29. A compound as defined in claim 28 in the form of a hydrochloric acid addition salt.

30. A compound as defined in claim 1 which is 13-ethyl-17α-(3-morpholino-1-propynyl)gona-3,5-dien-17-ol.

31. A compound as defined in claim 30 in the form of a hydrochloric acid addition salt.

32. A compound as defined in claim 1 which is 13-ethyl - 17α - [3-(4-hydroxypiperidino)-1-propynyl]gona-3,5-dien-17β-ol.

33. A compound as defined in claim 32 in the form of a hydrochloric acid addition salt.

34. A compound as defined in claim 1 which is l-17α-(3 - dimethylamino-1-propynyl)estra-3,5-dien-17-ol, substantially free of the d-enantiomorph.

35. A compound as defined in claim 34 in the form of a hydrochloric acid addition salt.

36. A compound as defined in claim 1 which is l-13-ethyl - 17α - (3-dimethylamino-1-propynyl)gona-3,5-dien-17-ol substantially free of the d-enamtiomorph.

37. A compound as defined in claim 36 in the form of a hydrochloric acid addition salt.

38. A compound as defined in claim 1 which is 17α-[3 bis(2 - hydroxyethyl) - amino-1-propynyl]-13-ethyl-gona-3,5-dien-17-ol.

39. A compound as defined in claim 38 in the form of a hydrochloric acid addition salt.

References Cited

UNITED STATES PATENTS

| | | | |
|---|---|---|---|
| 3,471,531 | 10/1969 | Hughes et al. | 260—239.5 |
| 3,471,478 | 10/1969 | Ledig et al. | 260—239.5 |

ELBERT L. ROBERTS, Primary Examiner

U.S. Cl. X.R.

260—239.55, 397.5